F. E. ROSS.
PHOTOGRAPHIC OBJECTIVE.
APPLICATION FILED MAR. 17, 1919.

1,352,028. Patented Sept. 7, 1920.

INVENTOR.
Frank E. Ross,

UNITED STATES PATENT OFFICE.

FRANK E. ROSS, OF ROCHESTER, NEW YORK,, ASSIGNOR TO EASTMAN KODAK COMPANY, OF ROCHESTER, NEW YORK, A CORPORATION OF NEW YORK.

PHOTOGRAPHIC OBJECTIVE.

1,352,028.   Specification of Letters Patent.   Patented Sept. 7, 1920.

Application filed March 17, 1919. Serial No. 283,198.

*To all whom it may concern:*

Be it known that I, FRANK E. ROSS, a citizen of the United States of America, residing at Rochester, in the county of Monroe and State of New York, have invented certain new and useful Improvements in Photographic Objectives, of which the following is a full, clear, and exact specification.

This invention relates to photographic objectives designed particularly to cover a wide field with flatness of field, and with freedom from distortion and flare, and corrected for astigmatism and chromatic and spherical aberration.

The objective is of the type that includes two spaced components, each of which may be a compound lens, one being positive and the other negative. The positive component comprises a positive lens of barium crown and a negative lens of glass with a much lower index of refraction. The negative component comprises an inner biconcave lens of highly refractive flint glass and an outer biconvex lens also of highly refractive flint glass. Between these is a positive meniscus lens of crown glass of low refractive index. I find that in a lens of this type the best results are obtained by making the difference between the refractive index of the meniscus lens and that of the lenses contacting with it as great as possible. The limiting case would be to have the meniscus as an air space, but this would introduce two glass-to-air surfaces, and thus increase the internal reflections or "flare," and I find that better results may be obtained by using crown glass of low refractive index. The wideness of field is obtained by making the components of considerable thickness, and I find that the errors are best compensated by making this thickness largely in the negative component, particularly in the meniscus lens. I attach great importance to these two features, both relating to this meniscus lens.

In order to secure freedom from distortion, the positive lens must also be made rather thick, as distortion is affected largely by the relative thickness of the components. It is necessary, therefore, in order to secure in a lens of this type freedom from distortion and also high covering power to make the sum of the thicknesses of the two components large with respect to the equivalent focal length, and I find that it must be at least one eighth thereof, and preferably even greater, to secure a flat field, free from distortion and corrected for other errors, over a fairly wide angle. It is also desirable in a lens designed for cameras that are of a folding type that it be made as compact as possible, and as I find it necessary to make the components thick, the space between the components must be kept small, and this has been an added limitation that I have successfully overcome.

In designing the objective it has been desirable to keep the Gauss points within the objective, for if, by altering the powers of the components and the space between them, the Gauss points are thrown in front of the objective, thus increasing its focal length and making it a tele-objective, the field covered will be very much limited; and the objects desired would not be attained.

In the accompanying drawings,—

Figure 1:
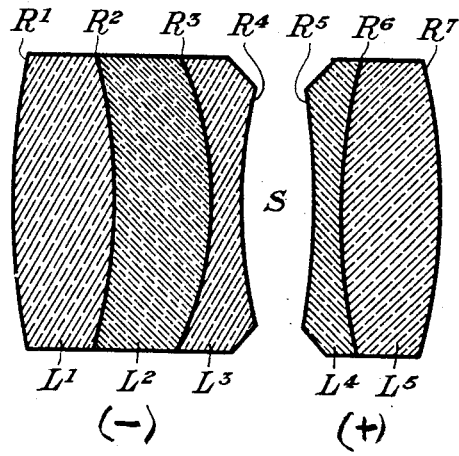
Figure 1 illustrates one embodiment of my invention.
Figure 2:
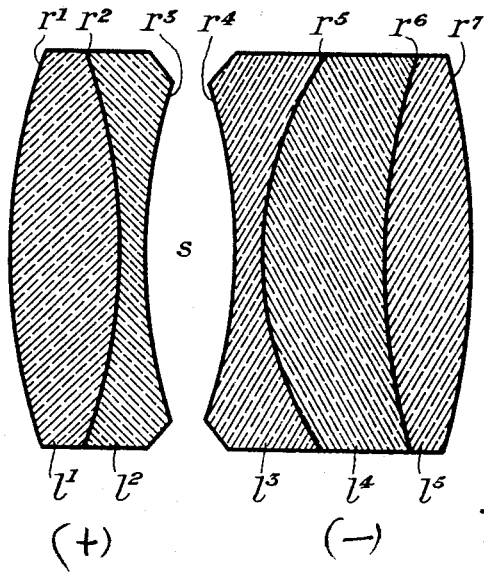
Fig. 2 is a second embodiment.

In the first mentioned objective, the front component is negative and comprises the three lens $L_1$, $L_2$ and $L_3$, contacting and preferably cemented together and the rear component is positive and comprises the two lens $L_1$ and $L_2$, the components being separated by an air space S. The dimensions in mm. are as follows:

| Radii. | Thickness and separation. |
|---|---|
| $R'=28.40$ | |
| $R^2=24.15$ | $L'=4$ |
| $R^3=13.40$ | $L^2=4$ |
| $R^4=25.30$ | $L^3=1$ |
| $R^5=27.30$ | $S=3$ |
| $R^6=24.15$ | $L^4=1$ |
| $R^7=22.22$ | $L^5=4$ |

| | Glass. | D line. | G' line. | ν |
|---|---|---|---|---|
| $L'$ | Dense flint | 1.61650 | 1.63833 | 36.5 |
| $L^2$ | Silicate crown | 1.52650 | 1.53800 | 58.4 |
| $L^3$ | Dense flint | 1.61650 | 1.63883 | 36.5 |
| $L^4$ | Telescope flint | 1.52110 | 1.53397 | 51.8 |
| $L^5$ | Barium crown | 1.61088 | 1.62448 | 57.2 |

Focal length of front component__ −298. 0
Focal length of rear component___ + 69. 4
Focal length of objective_____ + 98.02

The first Gauss point is 6.007 back of the surface R′ measured on the axis. The second Gauss point is 7.728 in front of surface $R^7$ measured on the axis. This objective will cover an angle of 60°, working at F/7.0; and can be used reversed, with $R^7$ as the entering surface for light rays; but when so used, it is not as well corrected.

In the second embodiment, which is my preferred form, the radii are denoted by $r$, and the lenses by $l$, respectively. The components are reversed in position as compared with the first form, the positive component being in front. The dimensions in mm. follow:

| Radii. | Thickness and separation. |
|---|---|
| $r'=22.0$ | $l'=4.5$ |
| $r^2=22.0$ | $l^2=1.0$ |
| $r^3=26.8$ | $s=3.5$ |
| $r^4=26.8$ | $l^3=1.0$ |
| $r^5=13.8$ | $l^4=5.0$ |
| $r^6=26.8$ | $l^5=3.5$ |
| $r^7=30.2$ | |

| | Glass. | D line. | G' line. | $\nu$ |
|---|---|---|---|---|
| $l^1$ | Barium crown | 1.61088 | 1.62448 | 57.2 |
| $l^2$ | Telescope flint | 1.52110 | 1.53397 | 51.8 |
| $l^3$ | Dense flint | 1.61650 | 1.63883 | 36.5 |
| $l^4$ | Silicate crown | 1.51750 | 1.52865 | 59.0 |
| $l^5$ | Dense flint | 1.61650 | 1.63883 | 36.5 |

Focal length of front component_ $+70.0$
Focal length of rear component__ $-411.0$
Focal length of objective_____ $98.028$ The first Gauss point is 7.174 behind the front surface, and the second Gauss point is 8.244 in front of the rear surface. This objective will cover an angle of 72°, working at F/6.0 and can be used reversed, but is not so satisfactory when so used.

It is to be noted that in this second embodiment, lens $l'$ is symmetrical and that only four radii of curvature are used, thus simplifying the manufacture.

In each of these embodiments, I have attained a lens having the desired characteristics. For a useful lens, I find also that the best results are attained when the width of the air space is less than the thickness of the meniscus lens, as is here the case. It is desirable, to attain the desired properties, that the thickness of the meniscus lens be at least as great as that of the biconvex lens contacting it; and preferably it should be as great as the sum of the thickness of the other two lenses in the same component as in the second embodiment. The specific data given may be departed from within certain limits, as the embodiments described are given as examples of the application of my invention, which is limited only as required by the scope of the following claims.

Where, in the specification and claims, surfaces are specified as contacting, it is understood that they may be separated, as is usual, by a thin transparent film of cement such as Canada balsam, the optical qualities of which are negligible, so that for all practical purposes the surfaces may be considered as actually contacting.

Having thus described my invention, what I claim as new and desire to secure by Letters Patent is:

1. An objective consisting of two spaced components, one of which is positive and comprises two contacting lenses and the other of which is negative and comprises three contacting lenses, the sum of the thicknesses of the two components being at least one-eighth of the equivalent focal length of the objective.

2. An objective consisting of two spaced components, one of which comprises three contacting lenses, the middle lens of said component having a refractive index less than that of either other lens of said component and having a thickness greater than the axial distance between the components.

3. An objective corrected for distortion and curvature of field and having a wide field and comprising two spaced components, one being positive and the other negative, the negative component consisting of three contacting lenses, the central one of which is of glass having a refractive index less by at least .08 than that of the glass composing the inner and outer lens of said component, the sum of the thicknesses of both components being at least one-eighth of the equivalent focal length of the objective and the Gauss points of the objective lying within the objective.

4. An objective consisting of two spaced components, one comprising two contacting lenses, and the other comprising three contacting lenses, the thickness of the middle lens of the second component being at least as great as that of the thicker of the other two lenses of the same component and having a refractive index less by at least .08 than the refractive indices of the other two lenses of the same component, at least one of the Gauss points of the objective being within the objective.

5. An objective comprising two spaced components, one of which is positive and the other negative, the negative component consisting of a plurality of contacting lenses, the sum of the thicknesses of the two components being greater than one-eighth of the focal length of the objective, and the thickness of each component being greater than the axial distance between the components.

6. An objective comprising two spaced components, each of which comprises a plurality of contacting lenses, one component being positive and the other negative, and the thickness of each being greater than the axial separation of the components, the sum of the thicknesses of the two components being greater than one-eighth of the equivalent focal length of the objective.

7. An objective comprising two spaced components, one of which is positive and the other negative, the negative component comprising three contacting lenses, the intermediate one of which is of glass of lower refractive index than the inner and outer lenses of the same component and having a thickness greater than the sum of the thickness of said inner and outer lenses, and greater than the axial distance between the components.

8. An objective comprising two spaced components, one consisting of two contacting lenses, these being an outer positive lens of high refractive index and an inner negative lens of low refractive index, and the other consisting of three contacting lenses, these being an inner negative lens of high refractive index, an outer positive lens of high refractive index and an intermediate positive lens of low refractive index, the sum of the thicknesses of the two components being at least one-eighth of the focal length of the objective.

9. An objective corrected for distortion, and curvature of field, and covering a wide field, and comprising two spaced components, one consisting of two contacting lenses, these being an outer positive lens of crown glass of high refractive index, and an inner negative lens of glass of low refractive index, and the other consisting of three contacting lenses, the inner being a negative lens, and the other two being positive lenses, the inner and outer lenses of said last mentioned component being of flint glass of refractive index higher than 1.60 and the intermediate lens being of crown glass of a refractive index less by at least .08 than the refractive index of said inner and outer lenses.

10. An objective corrected spherically, chromatically and astigmatically and also for distortion and curvature of field and covering a wide field and comprising a positive component consisting of two contacting lenses, these being a positive lens of highly refractive crown glass and a negative lens of glass of low refractive index, and a negative component spaced therefrom and consisting of three contacting lenses, these being an inner negative lens and an outer positive lens, both of highly refractive flint glass and an intermediate positive lens of crown glass of low refractive index, the thickness of the last named lens being greater than the axial distance between the components, and the sum of the thicknesses of the two components being greater than one-eighth of the equivalent focal length.

11. An objective corrected for astigmatism, distortion, chromatical and spherical aberration and curvature of field and comprising two spaced components, one consisting of an outer symmetrical biconvex lens and an inner biconcave lens in contact therewith, the other component consisting of an inner biconcave lens, a central lens in the shape of a positive meniscus and an outer biconvex lens, the concave surfaces facing the space between the components having the same curvatures, and there being only four different curvatures for all the surfaces in the objective.

12. An objective corrected for distortion and curvature of field and covering a wide angle and comprising two spaced components, one consisting of a positive lens of high refractive index and a negative lens of low refractive index in contact with each other, and the other consisting of three contacting lenses, the inner lens being negative and the outer positive and the central lens of the component being in the form of a positive meniscus, the inner and outer lenses being of the same glass of high refractive index and the central lens being of a glass with a refractive index less by .10 than that of the other lenses of said component, and the central lens having a thickness greater than the space between the components and also greater than the sum of the thicknesses of the other two lenses of said component, both Gauss points of said objective being within the objective.

Signed at Rochester, New York, this 13th day of March 1919.

FRANK E. ROSS.